(12) United States Patent
Lee et al.

(10) Patent No.: US 6,614,759 B1
(45) Date of Patent: Sep. 2, 2003

(54) ONU FUNCTION PROCESSING APPARATUS IN ATM-PON SYSTEM

(75) Inventors: Sang Ho Lee, Taejon (KR); Chan Kim, Taejon (KR); Hong Ju Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,921

(22) Filed: Feb. 4, 2000

(30) Foreign Application Priority Data

Dec. 27, 1999 (KR) ......................................... 1999-62773

(51) Int. Cl.[7] ............................................. H04L 12/56
(52) U.S. Cl. .................................. 370/236.2; 370/395.6
(58) Field of Search .............. 370/395.1, 395.6–395.21, 370/395.4, 395.61, 395.62, 230.1, 236.2, 474

(56) References Cited

U.S. PATENT DOCUMENTS

| | | | | | |
|---|---|---|---|---|---|
| 5,872,645 | A | * | 2/1999 | Proctor | 359/136 |
| 5,917,815 | A | * | 6/1999 | Byers et al. | 370/352 |
| 6,023,467 | A | * | 2/2000 | Abdelhamid et al. | 370/236.2 |
| 6,144,665 | A | * | 11/2000 | Karasawa | 370/395.1 |
| 6,229,788 | B1 | * | 5/2001 | Graves et al. | 370/230 |
| 6,421,150 | B2 | * | 7/2002 | Graves et al. | 359/118 |
| 6,519,255 | B1 | * | 2/2003 | Graves | 370/392 |

FOREIGN PATENT DOCUMENTS

JP 11-74890 3/1999

OTHER PUBLICATIONS

Yoshikawa et al., "Instant Transfer of Huge Contents on an Optical Subscriber Network," *Technical Report of IEICE, CS96–33, OCS96–10*, pp. 9–14, Jun., 1996 (with Abstract).

Ichibangase et al., "600Mbit/s / 150Mbit/s Asymmetri ATM–PDS Transmission Equipment for ATM VideO Services and ISDN," *Technical Report of IEICE, CS97–29, OCS97–9*, pp. 13–18, Jun., 1997 (with Abstract).

* cited by examiner

*Primary Examiner*—Min Jung
(74) *Attorney, Agent, or Firm*—Seed IP Law Group PLLC

(57) ABSTRACT

The present invention relates to an ATM-PON system realizing an access network of FTTC/H(fiber-to-the-curb/home), more particularly, to an optical network unit function processing apparatus in ATM-PON system linked directly to a plurality of subscriber's lines. The present invention includes an optical distribution network(ODN) matching part carrying out a function of a physical layer required for connecting an optical network unit (ONU)to an optical distribution network; an ATM processing part exchanging an ATM(asynchronous transfer mode) cell with the optical distribution matching part, the ATM processing part carrying out functions of changing a header of an interactive ATM cell, routing, QoS(quality of service) buffering according to service connecting levels, processing real-time OAM (operation administration and maintenance), and UPC(user parameter control); an AAL1 processing part exchanging an ATM cell with the ATM processing part and executing AAL(ATM adaptation layer)1 processing functions such as segmentation of subscriber lines, reassembly, disposal and generation of a pointer, disposal and generation of an ATM cell, restoration of ARTS(synchronous residual time stamp) clock, and cell delay variation(CDV); and a processor connecting part controlling operational modes of the optical distribution network matching part, the ATM processing part, and the AAL1 processing part and reading operational states thereof, the processor connecting part inserting an OAM cell interactively and extracting the OAM cell outside, the processor connecting part reading and writing an external upward/downward connecting memory for establishment and cancellation of connection.

5 Claims, 3 Drawing Sheets

ONU FUNCTION PROCESSING APPARATUS IN ATM-PON SYSTEM

TECHNICAL FIELD

The present invention relates to an ATM-PON system realizing an access network of FTTC/H(fiber-to-the-curb/home), more particularly, to an optical network unit function processing apparatus in ATM-PON system linked directly to a plurality of subscriber's lines.

BACKGROUND OF THE INVENTION

"An ATM-PON optical subscriber's transmitting system and a method thereof" as a prior art of a conventional ONU function processing apparatus in ATM-PON is disclosed in Japanese patent No. 1997-232212(OKI Electric Inc., 1997.8.28).

The above prior art proposes an optical subscriber's transmitting system comprising a WDM(wavelength division multiplexer) circuit for linking to a network, a PDS9passive double star) cell multi-divisional circuit, a PDS cell generation-division circuit, a subscriber's circuit for a subscriber's access, other control circuits, and buffers.

Unfortunately, only providing basic functions such as multi-divisional, ATM-PDS cell generation, etc. to realize an inexpensive optical transmitting system, the prior art fails to satisfy both service functions and quality required for an ONU system of high speed and large capacity.

"Instant Transfer of Huge Contents on an Optical Subscriber Network" providing a subscriber's processing apparatus which comprises AAL, ATM and PHY functional parts for linking to a network is disclosed as another prior art in Technical Report of IEICE CS96-33 by Tara Yoshikawa. The apparatus includes a variety of CPN(customer premises network) linking parts consisting of DSP, FPGA and the like for linking to a terminal, which is designed to transfer data through a common bus.

However, designed to provide inexpensive net work elements for minimum functions which realize an ONU structure based on a PC construction, the above prior art in the paper fails to satisfy both service functions and quality required newly for an ONU system of high speed and large capacity.

"600 Mbps 150 Mbps Asymmetric ATM-PDS Transmission Equipment for ATM Video Service and ISDN" is disclosed in Technical Report of IEICE CS97-29 by Hiroshi Ichibangase. The equipment provides a subscriber's processing unit comprising an optical signal processing part for accessing to a network, a PDS processing part, an ATM multi-division part, am ATM cell assembly/disassembly part, and a subscriber interface terminal for accessing CATV, image, 1.430 link.

As is the case with other prior arts, the prior art in the above-mentioned paper fails to satisfy both service function and quality required newly for an ONU system of high speed and large capacity since the prior art is designed to provide inexpensive network elements having functions of basic ATM multi division and cell assembly/disassembly for realizing ATM and AAL.

As mentioned in the above explanation, the prior art and the prior papers are constructed with minimum functional parts designed with inexpensive and small scale network elements.

However, an ONU of high speed and large capacity is required as new multi-media services appear lately.

Moreover, required are new additional functions such as QOS(quality of service) buffering for efficient network resource management and supplying high quality services, OAM(operation and management) processing, UPS(usage parameter control) and the like.

Therefore, such functional elements of the prior art and papers fail to realize an ONU of high speed and large capacity for efficient network resource management and supplying high quality services.

SUMMARY OF THE INVENTION

Accordingly, the present invention is directed to an optical network unit function processing apparatus in ATM-PON system that substantially obviates one or more of the problems due to limitations and disadvantages of the related art.

The object of the present invention is to provide an optical network unit processing apparatus including the minimum functions supplied by the prior art and prior papers, to which a QoS(quality of service) buffering function against 622 Mbps traffic, a real-time OAM(operation and management) processing function by a hardware, and an OPC(usage parameter control) function are added.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes an optical distribution network(ODN) matching part carrying out a function of a physical layer required for connecting an optical network unit (ONU)to an optical distribution network; an ATM processing part exchanging an ATM (asynchronous transfer mode) cell with the optical distribution matching part, the ATM processing part carrying out functions of changing a header of an interactive ATM cell, routing, QoS(quality of service) buffering according to service connecting levels, processing real-time OAM(operation administration and maintenance), and UPC(user parameter control); an AAL1 processing part exchanging an ATM cell with the ATM processing part and executing AAL(ATM adaptation layer)1 processing functions such as segmentation of subscriber lines, reassembly, disposal and generation of a pointer, disposal and generation of an ATM cell, restoration of ARTS(synchronous residual time stamp) clock, and cell delay variation(CDV); and a processor connecting part controlling operational modes of the optical distribution network matching part, the ATM processing part, and the AAL1 processing part and reading operational states thereof, the processor connecting part inserting an OAM cell interactively and extracting the OAM cell outside, the processor connecting part reading and writing an external upward/downward connecting memory for establishment and cancellation of connection.

Preferably, the ATM processing part further includes: an upward UTOPIA input part generating an upward connecting memory address in which an information corresponding to the ATM cell is stored by means of reconstructing a header information of the ATM cell read from the AAL1 processing part; an upward connecting table control part processing a parameter related to an upward OAM and UPC function by reading the parameter from the external upward connecting memory in use of an upward connecting memory address generated from the upward UTOPIA input part, the upward connecting table control part storing a value of the parameter in the upward connecting memory after completion of all processes wherein the value of the parameter needs to be updated; an UPC processing part searching to extract a cell exceeding a traffic rate which is compromised by each virtual connection to an upward traffic generated through the upward UTOPIA input part and the upward connecting table control part; an upward OAM processing part searching to detect generation and cancellation conditions of alarm to the upward traffic and generating an OAM cell corresponding to respective alarming states, the upward OAM processing part calculates and accumulates data related to performance when a PM cell is received; an upward UTOPIA output part transforming the received upward ATM cell data into bits, the upward UTOPIA output part transferring the bits to the optical distribution network matching part; an upward connecting-memory connecting part mediating requirements of respective functioning parts so that each of external upward connecting memory is read and written by the upward UTOPIA input part, the upward connecting-table control part, the UPC processing part, the upward OAM processing part, and the processor connecting part; and an upward test-cell generating part generating an ATM cell of an arbitrary form required by an user at an arbitrary speed in order to test external equipment connected to the optical distribution network matching part with ease.

More preferably, the ATM processing part further includes: an downward UTOPIA input part reading the ATM cell from the optical distribution network matching part and reconstructing a header information of the ATM cell, then the downward UTOPIA input part generating a downward connecting memory address storing an information corresponding to the ATM cell; a downward connecting-table control part reading and processing parameters, which are related to the downward OAM and QOS control functions, from an external downward connecting memory in use of a memory address generated from the downward UTOPIA input part, after completion of the processes, the downward connecting-table control part storing values of the parameters which need to be updated in the downward connecting memory; a downward OAM processing part detecting generation or cancellation condition of the downward traffic and generating an OAM cell corresponding to each alarming state, the downward OAM processing part calculating and accumulating function-related data when a forward or backward PM cell is received; a QOS control part storing the downward traffic in accordance with QOS requirements of respective subscribers in buffers of different levels and scheduling the buffers according to the respective QOS levels for differential services; a downward UTOPIA output part transforming the received upward ATM cell data into bits and transferring the bits to the AAL1 processing part; a downward connecting-memory connecting part mediating requirements of the respective parts so that each external downward connecting memory is read and written by the downward UTOPIA input part the downward connecting-table control part, the downward OAM processing part, and the processor connecting part; a cell memory connecting part mediating requirements of the respective parts wherein each of the external cell memory is read and written by the QOS control part and the processor connecting part; and a downward test-cell generating part generating an ATM cell of an arbitrary form required by an user at an arbitrary speed in order to test external equipments connected to the AAL1 processing part with ease.

Preferably, the AAL1 processing part further includes: an upward AAL processing part preparing ATM cell payloads by means of receiving frame numbers, channel numbers, data, and signal data which are inputted to respective lines of a plurality of subscribers and multiplexing the ATM cell payloads generated from the respective lines in order; an upward ATM processing part generating an ATM cell by adding an ATM header to the ATM cell payload multiplexed by the upward AAL processing part; and an upward UTOPIA connecting part supplying the ATM processing part with the ATM cell generated from the upward ATM processing part through an UTOPIA bus.

More, preferably, the AAL1 processing part further includes: a downward UTOPIA connecting part receiving the ATM cell transferred from the ATM processing part through the UTOPIA bus; a downward ATM processing part removing each of the ATM headers in each of the subscriber lines and extracting an ATM payload information; and a downward AAL processing part searching a damaged ATM cell and a mis-inserted ATM cell out of the ATM payload information extracted from the downward ATM processing part, the downward AAL processing part making compensation.

It is to be understood that both the foregoing general description and the following detailed description are exemplary and explanatory and are intended to provide further explanation of the invention as claimed.

BRIEF DESCRIPTION OF THE DRAWINGS

The embodiments of the present invention will be explained with reference to the accompanying drawings, in which.

DETAILED DESCRIPTION OF THE INVENTION

Reference will now be made in detail to the preferred embodiments of the present invention, examples of which are illustrated in the accompanying drawings.

Figure 1:
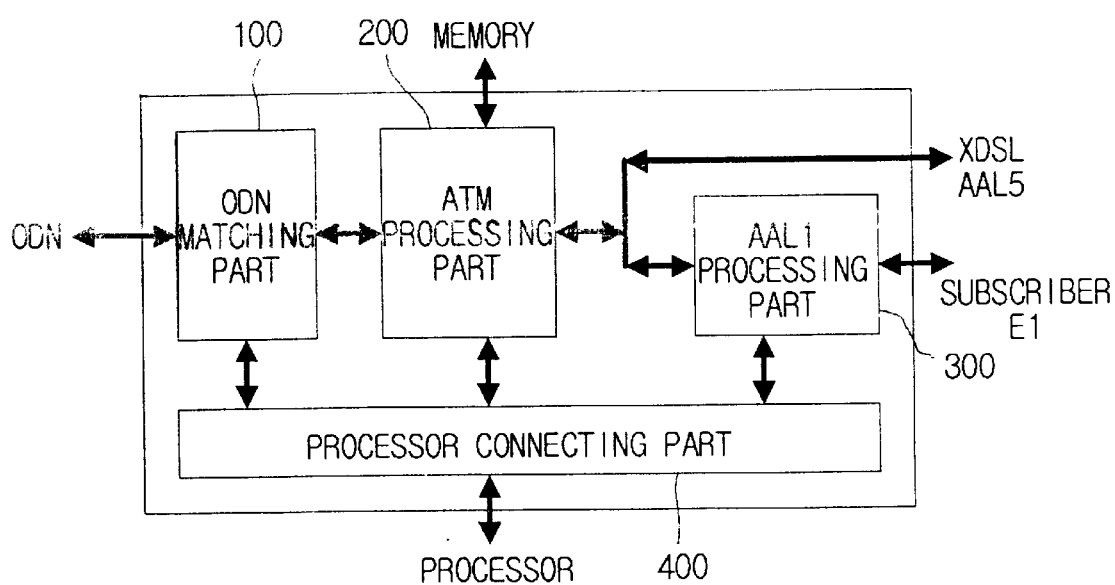
FIG. 1 shows a diagram of an ONU processing apparatus according to an embodiment of the present invention.
Figure 2:
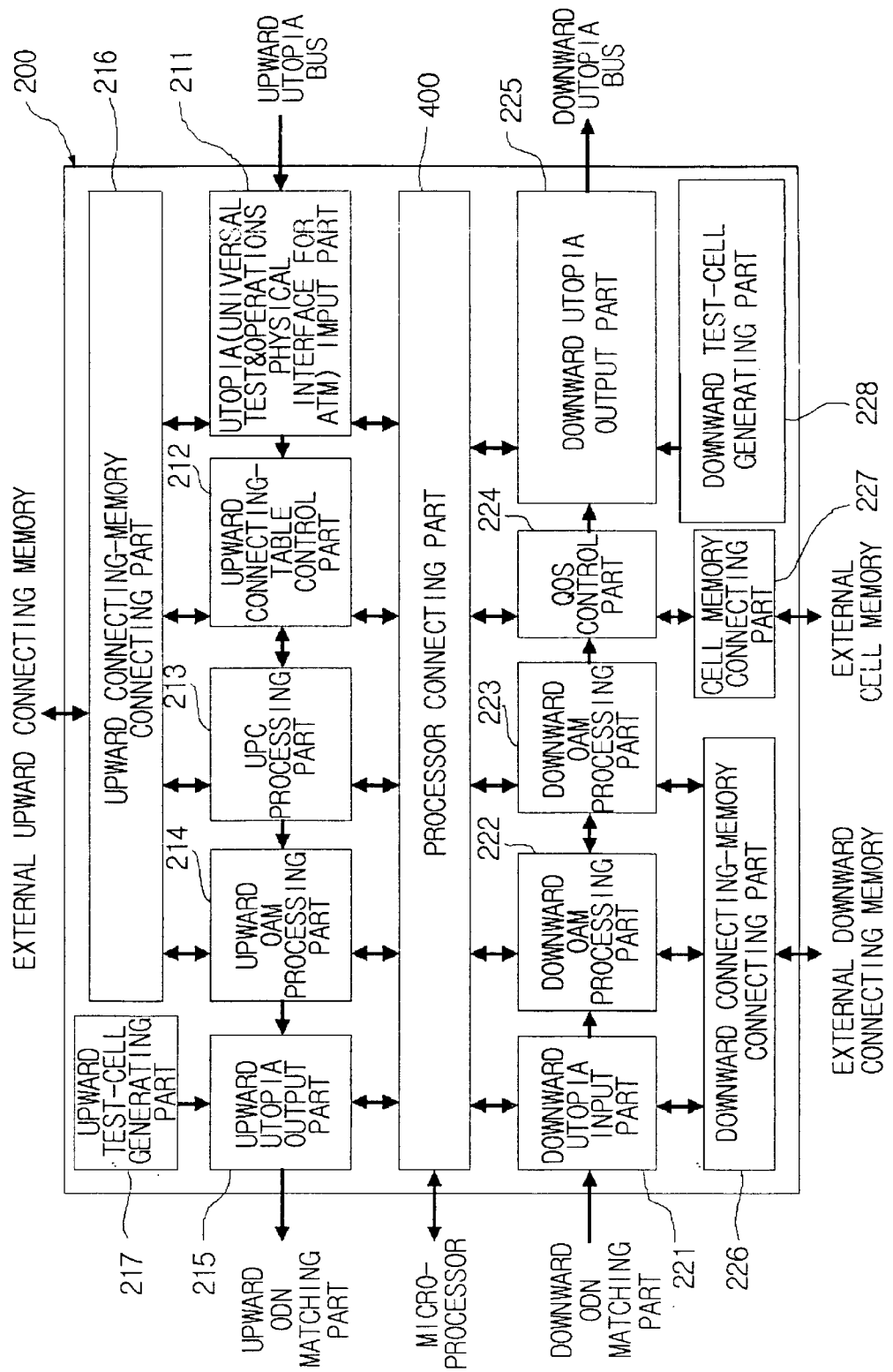
FIG. 2 shows a specific diagram of an ATM processing part in FIG. 1.
Figure 3:
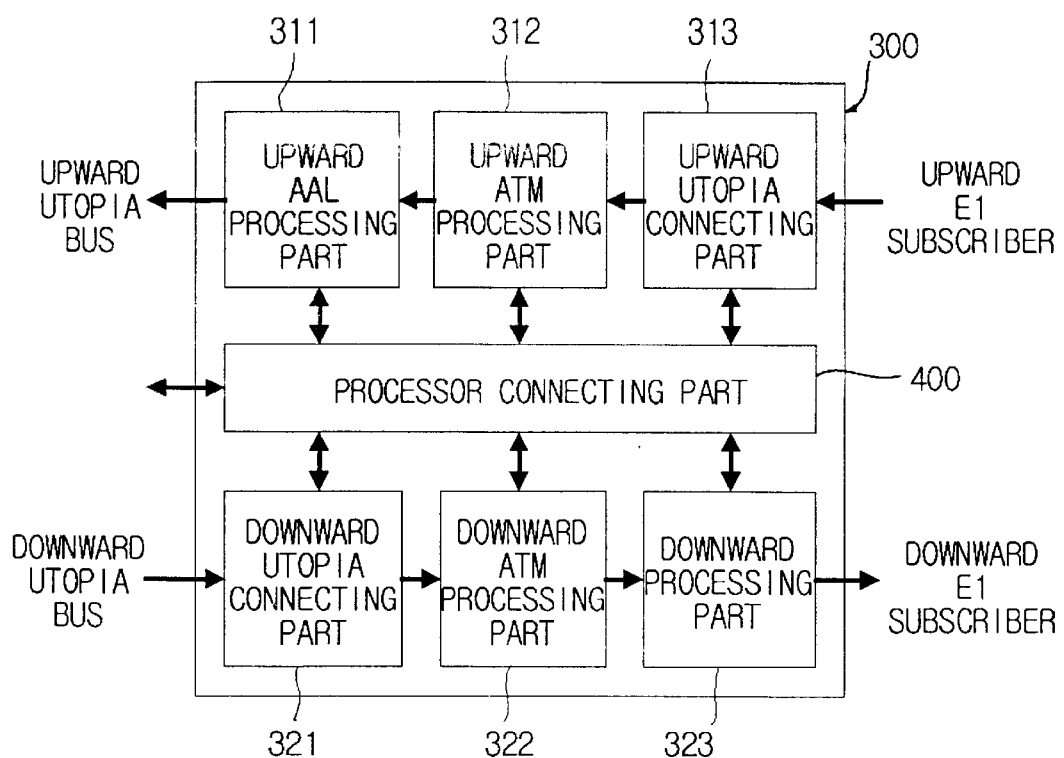
FIG. 3 shows a specific diagram of an AAL1 processing part in FIG. 1.

FIG. 1 shows a diagram of an ONU processing apparatus according to an embodiment of the present invention, FIG. 2 shows an inside specific diagram of an ATM processing part in FIG. 1, and FIG. 3 shows an inside specific diagram of an AAL1 processing part in FIG. 1.

By the present invention, on a single ASIC realized are such various functions, which are required commonly for an ONU(optical network unit) of an ATM-PON (passive optical network) to realize FTTC/H(Fiber-To-The-Curb-Home), as matching, ODN(optical distribution network) in ONU based on G.983.1, header change for interactive 622 Mbps traffics, routing, QoS buffering according to service levels of each connection, real-time OAM(operation administration and maintenance) processing, UPC(user parameter control), time slot switching, and AAL(ATM adaptation layer)1 processing.

Referring to FIG. 1, an ONU function processing apparatus in ATM-PON system includes an ODN matching part 100, an ATM processing part 200, an AAL1 processing part 300, and a processor connecting part 400.

Referring to FIG. 2, the ATM processing part 200 includes an UTOPIA(Universal Test & Operations Physical Interface for ATM) input part 211, an upward connecting-table control part 212, an UPC processing part 214, an upward OAM processing part 214, an upward UTOPIA output part 215, am upward connecting-memory connecting part 216, an upward test-cell generating part 217, a downward UTOPIA input part 221, a downward connecting-table control part 222, a downward OAM processing part 223, a QOS control part 224, a downward UTOPIA output part 225, a downward connecting-memory connecting part 226, a cell memory connecting part 227, and a downward test-cell generating part 228.

Referring to FIG. 3, the AAL1 processing part 300 includes an upward AAL processing part 311, an upward ATM processing part 312, an upward UTOPIA connecting part 313, a downward UTOPIA connecting part 321, a downward ATM processing part 322, and a downward processing part 323.

The operation of the ONU function processing apparatus in ATM-PON system according to an embodiment of the present invention, which is constructed with the above-described elements, will be explained in the following description.

The ODN matching part 100 carries out physical layer functions of generating a physical layer OAM (PLOAM:physical layer OAM) cell against a traffic transferred from the upward UTOPIA output part 215 of the ATM processing part 200, ranging, churning, discerning a frame and byte boundary against a downward traffic transferred from the ODN, processing the PLOAM cell, de-churning, and the like.

The upward UTOPIA input part 211 in the ATM processing part 200 reconstructs a header information by reading an ATM cell from the upward UTOPIA connecting part 311 of the AAL1 processing part 300, an external xDSL(x digital subscriber line), and an AAL5 subscriber and generates an upward connecting memory address where an information corresponding to the received ATM cell. An UTOPIA bus, which enables to be connected to the maximum 31 of devices, reads whether there exists a cell to be transmitted to the devices by testing in order.

The upward connecting-table control part 212 reads parameters which are related to the OAM and UPC functions from an external connecting memory in use of the upward connecting memory address generated from the upward UTOPIA input part 211, and transfers the parameters to each function part. After competing the processes, the upward connecting-table control part 212 stores values of the parameters needing to be updated in an external upward connecting memory.

The UPC processing part 213 protects the network from the cell delay and traffic due to the statistical multiplexing which are the characteristics of ATM and from the malfunctions of the subscriber's equipment due to mistake or intention. And, the UPC processing part 213 also detects and settles cells overrating the traffic rate which is compromised by each virtual connection against the traffic inputted into the network in order to secure the QoS(Quality of Service) to all connections previously set up. Namely, the UPC processing part 213 carries out an operation of bit-tagging of CLP(cell loss priority) or disposing the cell which exceeds the compromised traffic rate by means of comparing the traffic parameter transferred from the upward connecting-table control part 212 to the traffic rate of the inputted cell.

Detailed construction uses two steps of a generic cell rate algorithm based on a virtual scheduling algorithm in order to control a VBR(variable bit rate) traffic as well as a CBR (constant bit rate).

A first virtual cell rate algorithm executing part uses a peak cell rate and a CDV(cell delay variation) parameter.

A second generic cell rate algorithm executing part decides the violation of compromising in use of a sustainable cell rate, a maximum burst size, and a burst tolerance parameter.

The upward OAM processing part 214 detects generating/canceling conditions of AIS(Alarm Indication Signal), RDI (Remote Defect Indication), CC(Continuity Check) alarms, and generates an OAM cell corresponding to each alarming state. And, the upward OAM processing part 214 also calculates as well as accumulates function-related data when a forward PM(performance monitoring) cell or a backward PM cell concerning the upward traffic is received.

The upward UTOPIA output part 215 transforms the ATM cell data of 32 bits processed inside into 8 or 16 bits, thereby transferring to the ODN matching part 100.

The upward connecting-memory connecting part 216 mediates the requirements of the respective functioning parts so that each of the external upward connecting memory is read and written by the upward UTOPIA input part 211, the upward connecting-table control part 212, the UPC processing part 213, the upward OAM processing part 214, and the processor connecting part 400.

The upward test-cell generating part 217 generates an ATM cell of an arbitrary form required by the user at an arbitrary speed in order to test the external equipment connected to the upward matching part 100 with ease.

The downward UTOPIA input part 221 reads the ATM cell from the ODN matching part 100, reconstructs a header information of the ATM cell, then generates a downward connecting memory address storing the information corresponding to the received cell.

The downward connecting-table control part 222 reads parameters, which are related to the downward OAM and QOS control functions, from an external downward connecting memory in use of the downward connecting memory address generated from the downward UTOPIA input part 221, and transfers the parameters to each functioning part. After completion of the processes, the downward connecting-table control part 222 stores values of the parameters which need to be updated in the downward connecting memory.

The downward OAM processing part 223 detects the generation or cancellation condition of the AIS, RDI or CC alarm to the downward traffic and generates an OAM cell corresponding to each alarming state. Then, the downward OAM processing part 223 calculates and accumulates the function-related data when a forward or backward PM cell against the downward traffic is received.

The QOS control part 224 stores the QOS requirements of the respective connections in buffers of different levels and carries out a QOS buffering function of scheduling the buffers according to the respective QOS levels for differential services. In this case, the respective buffers are realized by external memories.

The downward UTOPIA output part 221 transforms the ATM cell data of 32 bits processed inside into 8 or 16 bits, thereby transferring to the downward UTOPIA connecting part 321.

The downward connecting-memory connecting part 226 mediates the requirements of the respective functioning parts so that each of the external downward connecting memory is read and written by the downward UTOPIA input part 221, the downward connecting-table control part 222, the downward OAM processing part 223, and the processor connecting part 400.

The cell memory connecting part 227 mediates the requirements of the respective functioning parts, whereby each of the external cell memory is read and written by the QOS control part 224 and the processor connecting part 400.

The downward test-cell generating part 228 generates an ATM cell of an arbitrary form required by the user at an arbitrary speed in order to test the external equipment connected to the AAL1 processing part 300 with ease.

The upward AAL processing part 313 of the AAL1 processing part 300 is ready for preparing ATM cells by means of receiving frame numbers, channel numbers, data, and signal data which are inputted to the respective lines, and also multiplexes cell payloads generated from the respective lines in order.

The upward ATM processing part 312 generates an ATM cell by adding an ATM header to the ATM payload multiplexed to be inputted by the upward AAL processing part 313.

The upward UTOPIA connecting part 311 transfers the multiplexed ATM cell to the upward UTOPIA input part 211 of the ATM processing part 200 through an UTOPIA bus.

The downward UTOPIA connecting part 321 receives the ATM cell from the downward UTOPIA output part 225 of the ATM processing part 200 through the UTOPIA bus.

The downward ATM processing part 322 searches the ATM cell by comparison, removes the ATM header in each of the lines, and transfers the ATM payload information to the downward AAL processing part 323.

The downward AAL processing part 323 searches an SAR header to extract a RTS(residual time stamp) value for a sequence number and an SRTS(synchronous residual time stamp) and makes compensation by distinguishing an existence of a pointer and by detecting a cell which is damaged or mis-inserted. Moreover, the AAL processing part 323 finds a boundary of a frame by the pointer, thereby generating a data and a signal in accordance with a frame synchronizing signal inputted from an outside.

The processor connecting part 400 controls operational modes of the functioning parts, reads the state of operation, inserts an OAM cell constructed by an external CPU from the upward and downward directions, extracts the OAM cell from the external CPU, and reads/writes the upward/downward memory for setting up the engagement and disengagement.

Accordingly, the present invention enables to realize an ASIC(application specific IC) of an ONU function processing apparatus which carries out the functions of forming an ATM layer which is lately demanded, connecting a network and a subscriber each other, QoS buffering of high speed traffic, processing real-time OAM, and UPC. Thus, the present invention enables to fabricate a system which is inexpensive and downsized, thereby developing a commercialized system which has service capacity of small subscribers as well as is competitive in price and performance.

It will be apparent to those skilled in the art that various modifications and variations can be made in an optical network unit function processing apparatus in ATM-PON system of the present invention without departing from the spirit or scope of the inventions. Thus, it is intended that the present invention cover the modifications and variations of this invention provided they come within the scope of the appended claims and equivalents.

What we claim:

1. An optical network unit function processing apparatus in ATM-PON system comprising:

an optical distribution network(ODN) matching part carrying out a function of a physical layer required for connecting an optical network unit (ONU)to an optical distribution network;

an ATM processing part exchanging an ATM (asynchronous transfer mode) cell with the optical distribution matching part, the ATM processing part carrying out functions of changing a header of an interactive ATM cell, routing, QoS(quality of service) buffering according to service connecting levels, processing real-time OAM(operation administration and maintenance), and UPC(user parameter control);

an AAL1 processing part exchanging an ATM cell with the ATM processing part and executing AAL(ATM adaptation layer)1 processing functions including segmentation of subscriber lines, reassembly, disposal and generation of a pointer, disposal and generation of an ATM cell, restoration of SRTS(synchronous residual time stamp) clock, and cell delay variation(CDV); and a processor connecting part controlling operational modes of the optical distribution network matching part, the ATM processing part, and the AAL1 processing part and reading operational states thereof, the processor connecting part inserting an OAM cell interactively and extracting the OAM cell outside, the processor connecting part reading and writing an external upward/downward connecting memory for establishment and cancellation of connection.

2. The optical network unit function processing apparatus in ATM-PON system according to claim 1, wherein the ATM processing part further comprising:

an upward UTOPIA input part generating an upward connecting memory address in which an information corresponding to the ATM cell is stored by means of reconstructing a header information of the ATM cell read from the AAL1 processing part;

an upward connecting table control part processing a parameter related to an upward OAM and UPC function by reading the parameter from the external upward connecting memory in use of an upward connecting memory address generated from the upward UTOPIA input part, the upward connecting table control part storing a value of the parameter in the upward connecting memory after completion of all processes wherein the value of the parameter needs to be updated;

an UPC processing part searching to extract a cell exceeding a traffic rate which is compromised by each virtual connection to an upward traffic generated through the upward UTOPIA input part and the upward connecting table control part;

an upward OAM processing part searching to detect generation and cancellation conditions of alarm to the upward traffic and generating an OAM cell corresponding to respective alarming states, the upward OAM processing part calculates and accumulates data related to performance when a PM cell is received;

an upward UTOPIA output part transforming the received upward ATM cell data into bits, the upward UTOPIA output part transferring the bits to the optical distribution network matching part;

an upward connecting-memory connecting part mediating requirements of respective functioning parts so that each of external upward connecting memory is read and written by the upward UTOPIA input part, the upward connecting-table control part, the UPC processing part, the upward OAM processing part, and the processor connecting part; and an upward test-cell generating part generating an ATM cell of an arbitrary form required by an user at an arbitrary speed in order to test external equipment connected to the optical distribution network matching part with ease.

3. The optical network unit function processing apparatus in ATM-PON system according to claim 2, wherein the ATM processing part further comprising:

an downward UTOPIA input part reading the ATM cell from the optical distribution network matching part and reconstructing a header information of the ATM cell, then the downward UTOPIA input part generating a downward connecting memory address storing an information corresponding to the ATM cell;

a downward connecting-table control part reading and processing parameters, which are related to the downward OAM and QOS control functions, from an external downward connecting memory in use of a memory address generated from the downward UTOPIA input part, after completion of the processes, the downward connecting-table control part storing values of the parameters which need to be updated in the downward connecting memory;

a downward OAM processing part detecting generation or cancellation condition of the downward traffic and generating an OAM cell corresponding to each alarming state, the downward OAM processing part calculating and accumulating function-related data when a forward or backward PM cell is received;

a QOS control part storing the downward traffic in accordance with QOS requirements of respective subscribers in buffers of different levels and scheduling the buffers according to the respective QOS levels for differential services;

a downward UTOPIA output part transforming the received upward ATM cell data into bits and transferring the bits to the AAL1 processing part;

a downward connecting-memory connecting part mediating requirements of the respective parts so that each external downward connecting memory is read and written by the downward UTOPIA input part, the downward connecting-table control part, the downward OAM processing part, and the processor connecting part;

a cell memory connecting part mediating requirements of the respective parts wherein each of the external cell memory is read and written by the QOS control part and the processor connecting part; and a downward test-cell generating part generating an ATM cell of an arbitrary form required by an user at an arbitrary speed in order to test external equipments connected to the AAL1 processing part with ease.

4. The optical network unit function processing apparatus in ATM-PON system according to claim 2, wherein the AAL1 processing part further comprising:

an upward AAL processing part preparing ATM cell payloads by means of receiving frame numbers, channel numbers, data, and signal data which are inputted to respective lines of a plurality of subscribers and multiplexing the ATM cell payloads generated from the respective lines in order;

an upward ATM processing part generating an ATM cell by adding an ATM header to the ATM cell payload multiplexed by the upward AAL processing part; and an upward UTOPIA connecting part supplying the ATM processing part with the ATM cell generated from the upward ATM processing part through an UTOPIA bus.

5. The optical network unit function processing apparatus in ATM-PON system according to claim 4, wherein the AAL1 processing part further comprising:

a downward UTOPIA connecting part receiving the ATM cell transferred from the ATM processing part through the UTOPIA bus;

a downward ATM processing part removing each of the ATM headers in each of the subscriber lines and extracting an ATM payload information; and a downward AAL processing part searching a damaged ATM cell and a mis-inserted ATM cell out of the ATM payload information extracted from the downward ATM processing part, the downward AAL processing part making compensation.

* * * * *